(12) United States Patent
Seino et al.

(10) Patent No.: US 7,332,261 B2
(45) Date of Patent: Feb. 19, 2008

(54) PHTHALOCYANINE COMPOUND, PROCESS FOR PREPARING THE SAME, AND OPTICAL RECORDING MEDIUM CONTAINING THE SAME

(75) Inventors: Kazuhiro Seino, Sodegaura (JP); Shinichi Nakagawa, Sodegaura (JP); Tsutami Misawa, Sodegaura (JP); Satoshi Kinoshita, Yao (JP); Akihiro Kosaka, Yao (JP); Hiroshi Terao, Yao (JP); Yojiro Kumagae, Yao (JP)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 553 days.

(21) Appl. No.: 10/504,089

(22) PCT Filed: Feb. 14, 2003

(86) PCT No.: PCT/JP03/01517

§ 371 (c)(1),
(2), (4) Date: Aug. 11, 2004

(87) PCT Pub. No.: WO03/068865

PCT Pub. Date: Aug. 21, 2003

(65) Prior Publication Data

US 2005/0201265 A1 Sep. 15, 2005

(30) Foreign Application Priority Data

Feb. 15, 2002 (JP) ............... 2002-039143
Aug. 30, 2002 (JP) ............... 2002-253836

(51) Int. Cl.
*G11B 7/248* (2006.01)
(52) U.S. Cl. ............. 430/270.16; 540/135; 540/139; 428/64.8
(58) Field of Classification Search ............ 430/270.16
See application file for complete search history.

(56) References Cited

U.S. PATENT DOCUMENTS 5,683,855 A * 11/1997 Shinkai et al. ......... 430/270.11

FOREIGN PATENT DOCUMENTS

JP 7-98887 A 4/1995

(Continued)

OTHER PUBLICATIONS

S. Dabak, "Synthesis of phthalocyanines crosswire-substituted with two alkylsulfanyl and two amino groups," *New J. Chem.*, 1997, pp. 267-271, vol. 21, No. 2 (cited in Search Report).

*Primary Examiner*—Mark F. Huff
*Assistant Examiner*—Anna L Verderame
(74) *Attorney, Agent, or Firm*—Joseph C. Suhadolnik

(57) ABSTRACT

A phthalocyanine compound represented by the following general formula (I) and the mixture thereof, and an optical recording medium containing the compound/mixture in its recording layer.

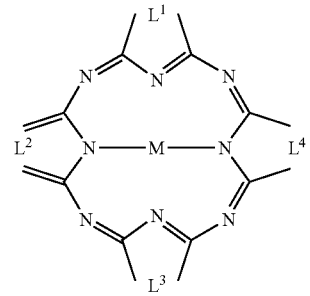

(I)

wherein in formula (I), M is two hydrogen atoms, a divalent metal atom, a mono-substituted trivalent metal atom, a di-substituted tetravalent metal atom, or an oxymetal, and $L^1$, $L^2$, $L^3$ and $L^4$ are each independently formula (a), formula (b), or formula (c):

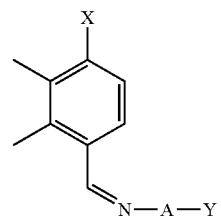

(a)

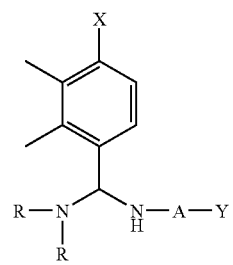

(b)

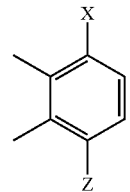

(c)

wherein X, Y, Z and R are defined.

12 Claims, No Drawings

FOREIGN PATENT DOCUMENTS

| | | |
|---|---|---|
| JP | 8-118800 A | 5/1996 |
| JP | 9-58123 A | 3/1997 |
| JP | 10-188341 A | 7/1998 |
| JP | 11-25504 A | 1/1999 |
| JP | 11-70732 A | 3/1999 |
| JP | 2002-188018 A | 7/2002 |
| JP | 2002188018 * | 7/2002 |
| JP | 2003-072238 A | 3/2003 |
| JP | 2004143086 * | 5/2004 |
| WO | 97/23354 A1 | 7/1997 |
| WO | 00/09522 A1 | 2/2000 |

* cited by examiner

PHTHALOCYANINE COMPOUND, PROCESS FOR PREPARING THE SAME, AND OPTICAL RECORDING MEDIUM CONTAINING THE SAME

TECHNICAL FIELD

The present invention relates to a novel phthalocyanine compound which is useful in the optoelectronics-related fields such as for optical disk recording materials, information recording, display sensors and optical cards; a process for preparing the same; and an optical recording medium such as an optical disk which is formed so that it contains the phthalocyanine compound in its recording layer.

BACKGROUND ART

With the rapid progress of the information-oriented society in recent years, optical information recording media, which enable by far higher density recording than magnetic recording media, are popularly utilized and actively studied. As the optical information recording media, known are a read-only type, in which information has been recorded beforehand and with which users can only read information; a write-once type, with which users can record and read information; and a re-writable type, with which users can record/read/erase information. Of these recording media, the write-once type media are being widely used as media which store bulk data compactly, because they are generally low-cost and excel in storage stability.

Of the write-once optical information recording media, a single-plate type of CD-R (CD-recordable), which is made up of a recording layer of organic dyes, a reflecting layer of metal provided on the recording layer and a protective layer provided on the reflective layer, and a plate-bonding type of DVD-R (DVD-recordable) are commonly and widely used.

The CD-R or DVD-R records information in the form of signals which are generated with changes in the organic dyes in its recording layer caused by irradiating the recording layer with laser beams from its substrate side. Moreover, various types of writers using a high-output semiconductor laser, as recording devices, and of software for information recording are commercially available. In recent years, a great number of CD-R recording devices which record at high speeds, 32 to 52× to the conventional recording speed, have been sold. And DVD-R recording devices which record at speeds of 4× or more have also been on the market. In high-speed recording, recording is performed in a shorter time than ordinary writing, but on the other hand, it requires high power laser irradiation; consequently, the margin required for the record reading characteristics narrows down. And problems have been indicated particularly of deterioration of jitter characteristics, which has not been tangible at ordinary recording speed, and increase in loading on a laser.

To overcome these problems, attempts have been made to form sharp and better-shaped pits in a shorter time even in high speed recording, from the viewpoints of the pyrolitic behavior and exothermic behavior of dyes in the recording layer, by causing pyrolitic behavior of dyes in the recording layer at a time by laser irradiation and increasing the speed of weight loss in pyrolysis or by making the peak of exothermic reaction sharp, as disclosed in Japanese Patent Laid-Open Nos. 09-058123, 10-188341 and 11-025504. However, the contents disclosed in the above documents are to improve the pyrolitic behavior of dye by using a special metal azo dye or cyanine dye or adding a quencher to a dye, and they do not provide sufficient improving effects.

In the meantime, attempts have been made to introduce a metallocene derivative and/or a ferrocene derivative into a dye composition in the recording layer by adding and/or binding the same to the dye composition, as disclosed in, for example, Japanese Patent Laid-Open Nos. 7-098887, 8-118800 and 11-70732, WO 97/23354 and WO 00/09522.

It is mentioned in Japanese Patent Laid-Open Nos. 7-098887, 8-118800 and 11-70732 that organometallic compounds such as metallocene derivatives and/or ferrocene derivatives are highly effective in improving the pyrolitic characteristics of dyes and the recording characteristics of the recording layer. Further, Japanese Patent Laid-Open No. 11-70732 discloses in column 0012 that the effect of adding the above described organometallic compounds, such as metallocene derivatives and/or ferrocene derivatives, is clearly different from that of adding the chelate compounds of transition metals used as singlet-oxygen quenchers, which are added for stabilizing the recording layer and improving the light-fastness of the same.

WO 97/23354 and WO 00/09522 disclose that the trouble of dye recovery/recycle can be improved by chemically linking a metallocene derivative and/or a ferrocene derivative to the side chain of the dye in the recording layer or to the axial substituent of the central metal.

The inventors of the present invention have also confirmed that to make high-speed recording characteristics better, the best measure is to allow organometallic compounds, such as metallocene derivatives and/or ferrocene derivatives, to act on the dye in the recording layer to improve the pyrolitic behavior of the dye.

However, it is impossible to fully accomplish higher sensitivity and better jitter characteristics, which are required for high-speed recording these days, by mixing and adding, or just linking organometallic compounds, such as metallocene derivatives and/or ferrocene derivatives, to the dye in the recording layer, and such recording media are not always sufficiently compatible with read-only CD.

In the meantime, the linking process of metallocene compounds requires many steps, which gives rise to a problem of increasing manufacturing cost.

DISCLOSURE OF INVENTION

Accordingly, the object of the present invention is to overcome the above-described problems and provide a dyestuff for optical information recording media which enhances the compatibility with CD player even when recording is performed at high speeds.

After directing tremendous research efforts toward overcoming the above described problem, the present inventors have found that not only sufficient recording sensitivity but effect of decreasing jitter value at high-speed recording can be obtained by bonding organometallic compounds, such as metallocene derivatives and/or ferrocene derivatives, to phthalocyanine-compounds via a linking group shown below. The inventors have also found that the compound/mixture can be produced at low cost by the following production process.

Specifically, the present invention is accomplished by the following (1) to (6):

(1) A phthalocyanine compound represented by the following general formula (I):

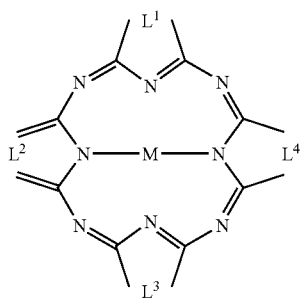

(I)

wherein in formula (I), M is two hydrogen atoms, a divalent metal atom, a mono-substituted trivalent metal atom, a di-substituted tetravalent metal atom, or an oxymetal, and $L^1$, $L^2$, $L^3$ and $L^4$ are each independently formula (a), formula (b), or formula (c)

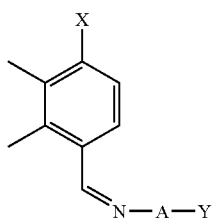

(a)

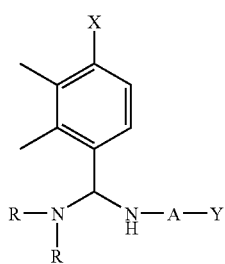

(b)

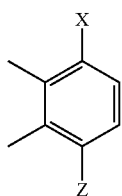

(c)

in formula (a), formula (b), and formula (c), X represents a substituted or unsubstituted alkyl group, alkoxy group, alkylthio group, aryloxy group, and arylthio group, Rs are each independently a hydrogen atom, a substituted or unsubstituted alkyl group with 1-6 of total carbon numbers, a substituted or unsubstituted aryl group with 6-10 of total carbon numbers, A represents a carbonyl group, a thiocarbonyl group, a sulfone group, a sulfine group, or a carboimidoyl group, Y represents a metal compound residue, and Z represents independently a hydrogen atom, a nitro group, or a halogen atom, and at least one of $L^1$-$L^4$ is formula (a) or (b).

(2) The phthalocyanine compound according to (1), wherein in the afore-mentioned formula (I), M is Cu, and at least one of the above $L^1$-$L^4$ represents formula (a-1) and at least one of the above $L^1$-$L^4$ represents formula (c-1):

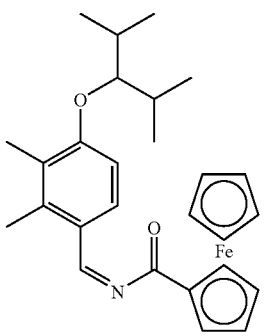

(a-1)

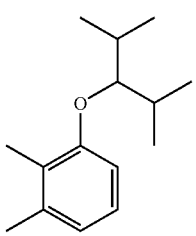

(c-1)

(3) The phthalocyanine compound according to (1), wherein in the afore-mentioned formula (I), M is Cu, at least one of the above $L^1$ to $L^4$ represents formula (b-1), and at least one of the above $L^1$ to $L^4$ represents formula (c-1):

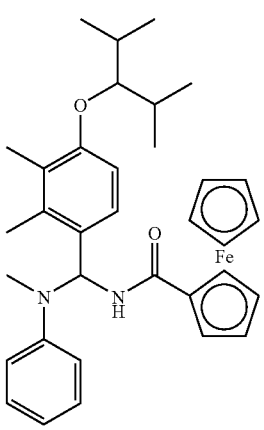

(b-1)

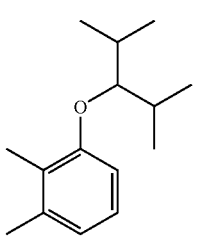

(c-1)

(4) A mixture comprising the phthalocyanine compounds represented by the following general formula (II):

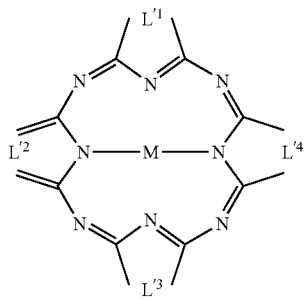

(II)

wherein in formula (II), M represents two hydrogen atoms, a divalent metal atom, a mono-substituted trivalent metal atom, a di-substituted tetravalent metal atom or an oxymetal; $L'^1$, $L'^2$, $L'^3$ and $L'^4$ are each independently formula (a), formula (b), or formula (c):

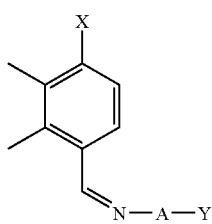

(a)

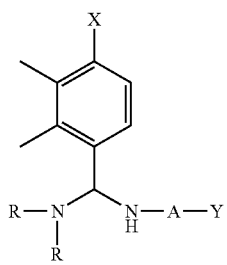

(b)

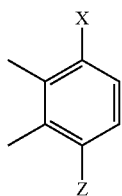

(c)

wherein in formulas (a), (b), and (c), X represents a substituted or unsubstituted alkyl, alkoxy, alkylthio, aryloxy or arylthio group; Rs are each independently a hydrogen atom, a substituted or unsubstituted alkyl group with 1-6 of total carbon numbers, a substituted or unsubstituted aryl group with 6-10 of total carbon numbers, A represents a carbonyl group, a thiocarbonyl group, a sulfone group, a sulfine group, or a carboimidoyl group; Y represents a metal compound residue; and Z independently represents a hydrogen atom, a nitro group or a halogen atom, provided that a mixture consisting of only phthalocyanine compounds in which all of the $L'^1$ to $L'^4$ are formula (c) is excluded.

(5) A process for preparing the phthalocyanine compound/mixture described in any one of the descriptions (1) to (4), which comprises the steps of:

reacting a phthalocyanine compound represented by the following general formula (III):

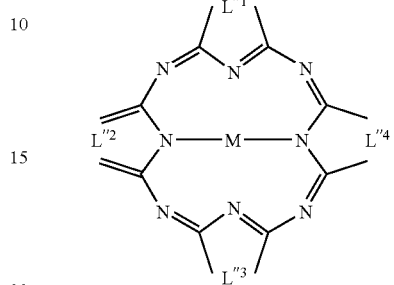

(III)

wherein in formula (III), M represents two hydrogen atoms, a divalent metal atom, a mono-substituted trivalent metal atom, a di-substituted tetravalent metal atom or an oxymetal; $L''^1$, $L''^2$, $L''^3$ and $L''^4$ independently represent formula (c):

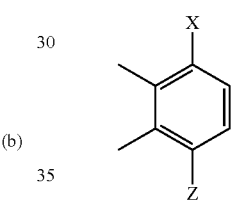

(c)

wherein in formula (c), X represents a substituted or unsubstituted alkyl group, alkoxy group, alkylthio group, aryloxy group, and arylthio group; Z independently represents a hydrogen atom, a nitro group, or a halogen atom and at least one of Z in $L''^1$ to $L''^4$ is a hydrogen atom, with a Vilsmeier complex prepared from a compound having an N—CHO group and a halogenating agent to synthesize an immonium salt of the phthalocyanine compound; adding a basic compound having the following general formula (IV):

R'—NH$_2$ (IV)

wherein R' represents a hydrogen atom, an unsubstituted alkyl group with 1 to 4 of total carbon numbers, or a substituted or unsubstituted aryl group with 6 to 15 of total carbon numbers; and reacting the product from the previous step with a compound having the following general formula (V):

Y-A-NH$_2$ (V)

wherein A represents a carbonyl group, a thiocarbonyl group, a sulfone group, a sulfine group or a carboimidoyl group; and Y represents a metal compound residue.

(6) An optical recording medium containing the phthalocyanine compound/mixture described in any one of the above descriptions (1) to (5) in its recording layer.

BEST MODE FOR CARRYING OUT THE INVENTION

In the following the present invention will be described in detail.

[Phthalocyanine Compound]

First preferred embodiments of the phthalocyanine compounds in accordance with the present invention will be described in detail.

Concrete examples of groups represented by X in formulae (a) to (c) include: substituted or unsubstituted straight-chain, branched-chain or cyclic alkyl groups with 1 to 10 carbons; substituted or unsubstituted straight-chain, branched-chain or cyclic alkoxy groups with 1 to 10 carbons; substituted or unsubstituted straight-chain, branched-chain or cyclic alkylthio groups with 1 to 15 carbons; substituted or unsubstituted aryloxy groups; and substituted or unsubstituted arylthio groups.

Examples of substituted or unsubstituted straight-chain, branched-chain or cyclic alkyl groups with 1 to 10 carbons include: unsubstituted alkyl groups such as methyl, ethyl, propyl, butyl, pentyl, hexyl, heptyl, octyl, nonyl, iso-propyl, sec-butyl, t-butyl, neo-pentyl, 1,2-dimethylpropyl, cyclohexyl, 1,3-dimethylbutyl, 1-iso-propylpropyl, 1,2-dimethylbutyl, 1,4-dimethylpentyl, 2-methyl-1-iso-propylpropyl, 1-ethyl-3-methylbutyl, 3-methyl-1-iso-propylbutyl, 2-methyl-1-iso-propylbutyl, 1-t-butyl-2-methylpropyl, 2-methylpentyl and 2-ethylhexyl; halogeno-substituted alkyl groups such as 2-chloroethyl, 3-bromopropyl, 2,2,3,3-tetrafluoropropyl and 1,1,1,3,3,3-hexafluoro-2-propyl; alkoxy-substituted alkyl groups such as 2-methoxyethyl, 2-ethoxyethyl, 2-butoxyethyl, 1-ethoxy-2-propyl, 3-methoxypropyl, 3-methoxybutyl, 2,2-dimethyl-1,3-dioxolan-4-ylmethyl and 1,3-diethoxy-2-propyl; amino-substituted alkyl groups such as 2-dimethylaminoethyl, 2-diethylaminoethyl, 2-dibutylaminoethyl and 2-diethylaminopropyl; and alkylthio-substituted alkyl groups such as 1,3-diethylthio-2-propyl.

Examples of substituted or unsubstituted straight-chain, branched-chain or cyclic alkoxy groups with 1 to 10 carbons include: unsubstituted alkoxy groups such as methoxy, ethoxy, propoxy, butoxy, pentyloxy, hexyloxy, heptyloxy, octyloxy, nonyloxy, iso-propoxy, sec-butoxy, t-butoxy, neo-pentyloxy, 1,2-dimethylpropoxy, cyclohexyloxy, 1,3-dimethylbutoxy, 1-iso-propylpropoxy, 1,2-dimethylbutoxy, 1,4-dimethylpentyloxy, 2-methyl-1-iso-propylpropoxy, 1-ethyl-3-methylbutoxy, 3-methyl-1-iso-propylbutoxy, 2-methyl-1-iso-propylbutoxy, 1-t-butyl-2-methylpropoxy, 2-methylpentyloxy and 2-ethylhexyloxy; halogeno-substituted alkoxy groups such as 2-chloroethoxy, 3-bromopropoxy, 2,2,3,3-tetrafluoropropoxy and 1,1,1,3,3,3-hexafluoro-2-propoxy; alkoxy-substituted alkoxy groups such as 2-methoxyethoxy, 2-ethoxyethoxy, 2-butoxyethoxy, 1-ethoxy-2-propoxy, 3-methoxypropoxy, 3-methoxybutoxy, 2,2-dimethyl-1,3-dioxolan-4-ylmethoxy and 1,3-diethoxy-2-propoxy; amino-substituted alkoxy groups such as 2-dimethylaminoethoxy, 2-diethylaminoethoxy, 2-dibutylaminoethoxy and 2-diethylaminopropoxy; and alkylthio-substituted alkoxy groups such as 1,3-diethylthio-2-propoxy.

Examples of substituted or unsubstituted straight-chain, branched-chain or cyclic alkylthio groups with 1 to 15 carbons include: unsubstituted alkylthio groups such as methylthio, ethylthio, propylthio, butylthio, pentylthio, hexylthio, heptylthio, octylthio, nonylthio, iso-propylthio, sec-butylthio, t-butylthio, neo-pentylthio, 1,2-dimethylpropylthio, cyclohexylthio, 1,3-dimethylbutylthio, 1-iso-propylpropylthio, 1,2-dimethylbutylthio, 1,4-dimethylpentylthio, 2-methyl-1-iso-propylpropylthio, 1-ethyl-3-methylbutylthio, 3-methyl-1-iso-propylbutyltho, 2-methyl-1-iso-propylbutylthio, 1-t-butyl-2-methylpropylthio, 2-methylpentylthio and 2-ethylhexylthio; halogeno-substituted alkylthio groups such as 2-chloroethylthio, 3-bromopropylthio, 2,2,3,3-tetrafluoropropylthio and 1,1,1,3,3,3-hexafluoro-2-propylthio; alkoxy-substituted alkylthio groups such as 2-methoxyethylthio, 2-ethoxyethylthio, 2-butoxyethylthio, 1-ethoxy-2-propylthio, 3-methoxy-propylthio, 3-methoxybutylthio, 2,2-dimethyl-1,3-dioxolan-4-ylmethylthio and 1,3-diethoxy-2-propylthio; amino-substituted alkylthio groups such as 2-dimethylaminoethylthio, 2-diethylaminoethylthio, 2-dibutylaminoethylthio and 2-diethyl-aminopropylthio; and alkylthio-substituted alkylthio groups such as 1,3-diethylthio-2-propylthio.

Examples of substituted or unsubstituted aryloxy groups include: phenyloxy, 2-chlorophenyloxy, 3-chlorophenyloxy, 4-chlorophenyloxy, 2-bromophenyloxy, 3-bromophenyloxy, 4-bromophenyloxy, 2-methylphenyloxy, 3-methylphenyloxy, 4-methylphenyloxy, 2-chloro-3-methylphenyloxy, 3-chloro-4-ethylphenyloxy, 2-methoxyphenyloxy, 3-methoxyphenyloxy, 4-methoxyphenyloxy, 4-chloro-3-methoxyphenyloxy, 4-methyl-3-methoxylphenyloxy, 2-methylaminophenyloxy, 2-dimethylaminophenyloxy, 2-ethylaminophenyloxy, 2-(methylethylamino)phenyloxy, 2-diethylaminophenyloxy, 2-propylaminophenyloxy, 2-dipropylaminophenyloxy, 3-methylaminophenyloxy, 3-dimethylaminophenyloxy, 3-ethylaminophenyloxy, 3-(methylethylamino)phenyloxy, 3-diethylaminophenyloxy, 3-propylaminophenyloxy, 3-dipropylaminophenyloxy, 4-methylaminophenyloxy, 4-dimethylaminophenyloxy, 4-ethylaminophenyloxy, 4-(methylethylamino)phenyloxy, 4-diethylaminophenyloxy, 4-propylaminophenyloxy and 4-dipropylaminophenyloxy.

Examples of substituted or unsubstituted arylthio groups include: phenylthio, 2-chlorophenylthio, 3-chlorophenylthio, 4-chlorophenylthio, 2-bromophenylthio, 3-bromophenylthio, 4-bromophenylthio, 2-methylphenylthio, 3-methylphenylthio, 4-methylphenylthio, 2-chloro-3-methylphenylthio, 3-chloro-4-ethylphenylthio, 2-methoxyphenylthio, 3-methoxyphenylthio, 4-methoxy-phenylthio, 4-chloro-3-methoxyphenylthio, 4-methyl-3-methoxyphenylthio, 2-methylaminophenylthio, 2-dimethylaminophenylthio, 2-ethylaminophenylthio, 2-(methylethylamino)phenylthio, 2-diethylaminophenylthio, 2-propylaminophenylthio, 2-dipropylaminophenylthio, 3-methylaminophenylthio, 3-dimethylaminophenylthio, 3-ethylaminophenylthio, 3-(methylethylamino)phenylthio, 3-propylaminophenylthio, 3-dipropylaminophenylthio, 4-methylaminophenylthio, 4-dimethylaminophenylthio, 4-ethylaminophenylthio, 4-(methylethylamino)phenylthio, 4-diethylaminophenylthio, 4-propylaminophenylthio and 4-dipropylaminophenylthio.

Examples of divalent metals represented by M include: Cu(II), Zn(II), Fe(II), Co(II), Ni(II), Ru(II), Rh(II), Pd(II), Pt(II), Mn(II), Mg(II), Ti(II), Bi(II), Ca(II), Ba(II), Cd(II), Hg(II), Pb(II), Sn(II); examples of mono-substituted trivalent metals include Al—Cl, Al—Br, Al—F, Al—I, Ga—Cl, Ga—F, Ga—I, Ga—Br, In—Cl, In—Br, In—I, In—F, Tl—Cl, Tl—Br, Tl—I, Tl—F, $A_1$-$C_6H_5$, Al—$C_6H_4(CH_3)$, In—$C_6H_5$, In—$C_6H_4(CH_3)$, In—$C_{10}H_7$, Mn(OH), Mn(O$C_6H_5$), Mn[OSi(CH$_3$)$_3$], FeCl and RuCl. Examples of di-substituted tetravalent metals include CrCl$_2$, SiCl$_2$, SiBr$_2$, SiF$_2$, SiI$_2$, ZrCl$_2$, GeCl$_2$, GeBr$_2$, GeI$_2$, GeF$_2$, SnCl$_2$, SnBr$_2$, SnI$_2$, SnF$_2$, TiCl$_2$, TiBr$_2$, TiF$_2$, and Si(OH)$_2$, Ge(OH)$_2$, Zr(OH)$_2$, Mn(OH)$_2$, Sn(OH)$_2$, TiR$^1_2$, CrR$^1_2$, SiR$^1_2$, SnR$^1_2$, GeR$^1_2$ (where R$^1$ is an alkyl group, phenyl group, naphthyl group and derivatives thereof), Si(OR$^2$)$_2$, Sn(OR$^2$)$_2$, Ge(OR$^2$)$_2$, Ti(OR$^2$)$_2$ and Cr(OR$^2$)$_2$ (where R$^2$ is an alkyl group, an alkylcarbonyl group, a phenyl group, a naphtyl group, a trialkylsilyl group, a dialkylalkoxysilyl group, and derivatives thereof]. Examples of the oxymetals include VO, MnO and TiO.

Concrete examples of groups represented by Z in the formula (c) include: a hydrogen atom; a nitro group; and halogen atoms such as fluorine, chlorine or iodide atom, and preferably a hydrogen atom and bromine atom.

Concrete examples of groups represented by A in formula (a) or (b) include: carbonyl, thiocarbonyl, sulfone, sulfine and carboimidoyl group, and preferably carbonyl and thiocarbonyl. The carboimidoyl group may be substituted and examples of the substituted carboimidoyl groups include: N-methylcarboimidoyl, N-phenylcarboimidoyl, N-methoxycarboimidoyl and N-hydroxycarboimidoyl.

The metal compound residues represented by Y in formula (a) or (b) may be any ones, as long as they are residues of metal-containing compounds, and preferably residues of metallocene compounds or derivatives thereof. Specifically, metallocene compounds such as Fe(Cp)$_2$ (where, Cp denotes cyclopentadienyl group), Co(Cp)$_2$, Ni(Cp)$_2$, Ru(Cp)$_2$, Os(Cp)$_2$, Mn(Cp)$_2$, Cr(Cp)$_2$, W(Cp)$_2$, V(Cp)$_2$, Sc(Cp)$_3$, Y(Cp)$_3$, La(Cp)$_3$, Ce(Cp)$_3$, Pr(Cp)$_3$, Nd(Cp)$_3$, Sm(Cp)$_3$, Gd(Cp)$_3$, Er(Cp)$_3$, Tm(Cp)$_3$, Yb(Cp)$_3$, and cyclopentadienylmanganocene tricarbonyl; metallocene compound residues having substituted metal such as titanocenediphenoxide, bis(cyclopentadienyl)bis(2,6-difluoro-3-(1H-pyrrol-1-yl)phenyl titanium and cyclopentadienyl manganocene tricarbonyl are mentioned as examples. More preferably, Fe(Cp)$_2$ may be mentioned. Moreover, these metallocene compound residues may be substituted by an alkyl group, an aryl group, and an acyl group.

Examples of groups represented by R in formula (b) are: hydrogen, substituted or unsubstituted alkyl groups with 1 to 6 of total carbon atoms and substituted or unsubstituted aryl groups with 6 to 10 of total carbon atoms, and preferred groups are: unsubstituted alkyl groups such as methyl, ethyl, n-propyl and iso-propyl; and aryl groups such as phenyl and naphthyl.

(Definition of Phthalocyanine Mixture)

The phthalocyanine mixture of the present invention is a mixture made up of the phthalocyanine compounds having the following general formula (II) and preferably obtained by a preparing process in accordance with the present invention.

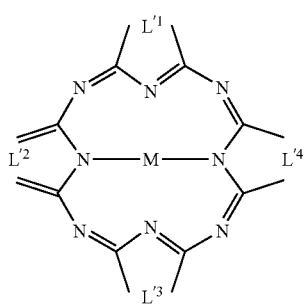

(II)

wherein M and L$^{\prime 1}$ to L$^{\prime 4}$ represent the same as described above.

Specifically, the phthalocyanine mixture of the present invention is a mixture containing at least 2 types or more of the compounds selected from the group consisting of:

phthalocyanine compound (C): all of L$^{\prime 1}$ to L$^{\prime 4}$ are (c);

phthalocyanine compound (A): one of L$^{\prime 1}$ to L$^{\prime 4}$ is (a) and remaining three are (c);

phthalocyanine compound (A2): two of L$^{\prime 1}$ to L$^{\prime 4}$ are (a) and remaining two are (c);

phthalocyanine compound (A3): three of L$^{\prime 1}$ to L$^{\prime 4}$ are (a) and remaining one is (c);

phthalocyanine compound (A4): all of L$^{\prime 1}$ to L$^{\prime 4}$ are (a);

phthalocyanine compound (B): one of L$^{\prime 1}$ to L$^{\prime 4}$ is (b) and remaining three are (c);

phthalocyanine compound (B2): two of L$^{\prime 1}$ to L$^{\prime 4}$ are (b) and remaining two are (c);

phthalocyanine compound (B3): three of L$^{\prime 1}$ to L$^{\prime 4}$ are (b) and remaining one is (c);

phthalocyanine compound (B4): all of L$^{\prime 1}$ to L$^{\prime 4}$ are (b).

phthalocyanine compound (AB): one of L$^{\prime 1}$ to L$^{\prime 4}$ is (a), another one is (b) and remaining two are (c);

phthalocyanine compound (A2B): two of L$^{\prime 1}$ to L$^{\prime 4}$ are (a), another one is (b) and remaining one is (c);

phthalocyanine compound (AB2): one of L$^{\prime 1}$ to L$^{\prime 4}$ is (a), another two are (b) and remaining one is (c);

phthalocyanine compound (A2B2): two of L$^{\prime 1}$ to L$^{\prime 4}$ are (a) and remaining two are (b);

phthalocyanine compound (A3B): three of L$^{\prime 1}$ to L'4 are (a) and remaining one is (b); and phthalocyanine compound (AB3): one of L$^{\prime 1}$ to L$^{\prime 4}$ is (a) and remaining three are (b).

More preferably, the mixture contains:

phthalocyanine compound (C): all of L$^{\prime 1}$ to L$^{\prime 4}$ are (c);

phthalocyanine compound (A): one of L$^{\prime 1}$ to L$^{\prime 4}$ is (a) and remaining three are (c);

phthalocyanine compound (A2): two of L$^{\prime 1}$ to L$^{\prime 4}$ are (a) and remaining two are (c);

phthalocyanine compound (B): one of L$^{\prime 1}$ to L$^{\prime 4}$ is (b) and remaining three are (c);

phthalocyanine compound (B2): two of L$^{\prime 1}$ to L$^{\prime 4}$ are (b) and remaining two are (c); and phthalocyanine compound (AB): one of L$^{\prime 1}$ to L$^{\prime 4}$ is (a), another one is (b) and remaining two are (c).

In various types of phthalocyanine compounds that constitute the mixture of the present invention, when two or more of L$^{\prime 1}$ to L$^{\prime 4}$ are moieties represented by the formula (a), each of X, A and Y may be different among the moieties; when two or more of L$^{\prime 1}$ to L$^{\prime 4}$ are moieties represented by the formula (b), each of X, A, Y and R may be different among the moieties; and when two or more of L$^{\prime 1}$ to L$^{\prime 4}$ are moieties represented by the formula (c), each of X and Z may be different among the moieties.

Naturally, the structures different in relative position of the substituents on L$^{\prime 1}$ to L$^{\prime 4}$ and the structures different in direction of the units (X and Z) of the formula (a), formula (b) and formula (c) are also included in the above described compounds/mixtures of various types.

(Preparation Process)

The phthalocyanine compounds/mixture of the present invention can be prepared without the intermediate extraction process, and the following method is mentioned as an example of the preparation processes:

A phthalocyanine compound having the following general formula (III):

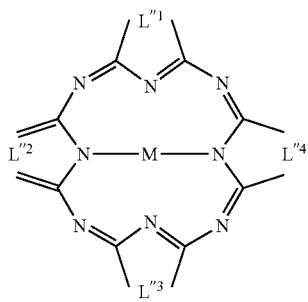

(III)

wherein in formula (III), M represents two hydrogen atoms, a divalent metal atom, a mono-substituted trivalent metal atom, a di-substituted tetravalent metal atom or an oxymetal; $L''^1$, $L''^2$, $L''^3$ and $L''^4$ independently represent formula (c):

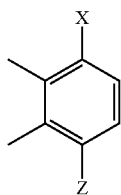

(c)

wherein X and Z represent the same as described above, is reacted with a Vilsmeier complex prepared from a compound having an N—CHO group and a halogenating agent to synthesize an immonium salt of the phthalocyanine compound;

a basic compound having the following general formula (IV):

R'—NH$_2$ (IV)

wherein R' represents a hydrogen atom, an unsubstituted alkyl group with 1 to 4 carbons, or a substituted or unsubstituted aryl group with 6 to 15 carbons, is added to the immonium salt; and the product from the previous step is reacted with a compound having the following general formula (V):

Y-A-NH$_2$ (V)

wherein A represents a carbonyl, thiocarbonyl, sulfone, sulfine or carboimidoyl; and Y represents a metal compound residue.

The phthalocyanine compound (III) used as a raw material can be prepared by the known method described in, for example, Japanese Patent Laid-Open No. 5-247363.

A Vilsmeier complex is prepared from a compound having an N—CHO group and a halogenating agent, and the Vilsmeier complex added to the solvent solution of the above phthalocyanine compound (III) may be prepared by directly reacting the compound having an N—CHO group with the halogenating agent or by mixing the compound and the agent in a solvent, or the Vilsmeier complex may be formed in the solvent solution of the above phthalocyanine compound (III) by introducing them separately into the system.

Concrete examples of compounds having an N—CHO group include N,N-dimethylformamide, N-methylformanilide and N,N-diisopropylformamide, and preferred are N,N-dimethylformamide and N-methylformanilide.

Concrete examples of halogenating agents include phosphrous oxychloride (phosphoryl chloride, etc.), carbonyl chloride (phosgene), thionyl chloride, oxalyl chloride, triphenylphosphine.bromine and hexachlorotriphosphazatriene, and preferred are phosphoryl chloride, phosgene and oxalyl chloride.

Solvents used in the preparation of a Vilsmeier complex and the synthesis of an immonium salt include: for example, polar solvents such as pyridine, N,N-dimethylformamide, N-methylformanilide, dimethylacetamide, dimethylsulfoxide, N,N-dimethylimidazolidinone and sulfolane; and aromatic hydrocarbon solvents such as benzene, toluene, xylene, trimethylbenzene, chlorobenzene, dichlorobenzene and nitrobenzene.

On a mole basis, the ratio of the amount of the Vilsmeier complex prepared to the above phthalocyanine compound is 1 to 30, and preferably 1 to 15. And the ratio of the amounts of the compound having N—CHO and the halogenating agent used to the above phthalocyanine compound are 1 to 100 and 1 to 30, and preferably 1 to 50 and 1 to 15, respectively.

In the reaction of the phthalocyanine compound with the Vilsmeier complex, a compound having N—CHO may be used as a solvent.

In the preparation of a Vilsmeier complex and the synthesis of an immonium salt, the reaction temperature is −50 to 80° C. and preferably −10 to 50° C.

When the Vilsmeier complex is prepared beforehand, the reaction time for the preparation is 5 minutes to 10 hours and preferably 30 minutes to 3 hours, and in the subsequent immonium salt synthesis, the reaction time is preferably 1 to 96 hours and more preferably 3 to 36 hours. When the Vilsmeier complex is prepared in situ, the reaction time is also preferably 1 to 96 hours and more preferably 3 to 36 hours.

Concrete examples of basic compounds having the general formula (IV) which are added after the synthesis of immonium salt include: ammonia, alkylamines and arylamines, and preferred are ammonia; alkylamines such as methylamine, ethylamine and butylamine; and arylamines such as aniline and 2-methylaniline, and more preferred is ammonia.

Preferably the basic compound is added excessively to such an extent that the immonium salt, as the reaction product of the Vilsmeier complex and the phthalocyanine compound, excess Vilsmeier complex and the halogenating agent disappear, and the amount, on a mole base, is preferably 1 to 100 fold the amount of the halogenating agent used and more preferably 2 to 30 fold.

The basic compound may be added at a time, but preferable it is added gradually while cooling the mixture, because its addition involves neutralization reaction as an exothermic reaction. When the basic compound is a liquid, preferably it is added dropwise, whereas when the basic compound is a gas, preferably it is added using an introduction tube while bubbling the mixture.

The reaction temperature is −50 to 80° C. and preferably −10 to 50° C.

The reaction time is 30 minutes to 30 hours and preferably 1 to 6 hours, though it depends on the time the addition of the basic compound takes.

Preferably the compound having the general formula (V) which includes a metal compound residue is added to such an extent that an imine compound synthesized by the addition of the above basic compound fully reacts, and the amount, on a mole base, is preferably 1 to 30 fold the amount of the phthalocyanine compound and more preferably 1 to 10 fold. The compound may be added at a time or in divided portions.

To allow the reaction to progress smoothly, an acid catalyst such as p-toluenesulfonic acid may be added.

The reaction temperature is 0° C. to the reflux temperature of the solvent and preferably 20° C. to the reflux temperature of the solvent.

The reaction time is preferably 30 minutes to 72 hours and more preferably 2 to 24 hours.

Before the addition of the compound having the general formula (V), an inorganic salt by-produced when adding the basic compound (IV) may be filtered out.

Then after-treatment, such as distilling off the solvent or/and discharging the reaction liquid in a poor solvent to the phthalocyanine compound to filter out the precipitate, is done after the reaction to obtain the phthalocyanine compound/mixture of the present invention.

If the resultant phthalocyanine compound/mixture is purified by recrystallization or by column chromatography, a phthalocyanine compound of high purity can be obtained.

The phthalocyanine compound of high purity thus obtained can be used in combination with other phthalocyanine compounds/mixtures and the phthalocyanine compounds/mixtures with the phthalocyanine compound of high purity added thereto can be used in the form of a mixture thereof.

Concrete examples of preferred phthalocyanine compounds/mixtures, which have the general formula (I), of the present invention will be shown in Table-1 to Table-4 below; however, it is to be understood that these examples are not intended to limit the present invention.

TABLE 1

Phthalocyanine Compounds (A)

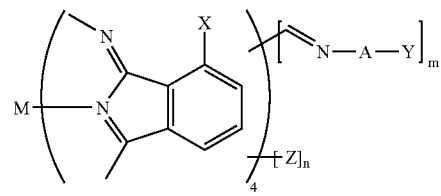

| Comp | M | X | A | Y | m | Z | n |
|------|------|------|------|------|---|------|------|
| (1)  | Cu   | $OCH[CH(CH_3)_2]_2$ | C=O  | $Fe(Cp)_2$ | 1 | H | 3 |
| (2)  | Pd   | $OCH[CH(CH_3)_2]_2$ | C=O  | $Fe(Cp)_2$ | 1 | H | 3 |
| (3)  | VO   | $OCH[CH(CH_3)_2]_2$ | C=O  | $Fe(Cp)_2$ | 1 | H | 3 |
| (4)  | FeCl | $OCH[CH(CH_3)_2]_2$ | C=O  | $Fe(Cp)_2$ | 1 | H | 3 |
| (5)  | Zn   | $OCH[CH(CH_3)_2]_2$ | C=O  | $Fe(Cp)_2$ | 1 | H | 3 |
| (6)  | AlCl | $OCH[CH(CH_3)_2]_2$ | C=O  | $Fe(Cp)_2$ | 1 | H | 3 |
| (7)  | MnOH | $OCH[CH(CH_3)_2]_2$ | C=O  | $Fe(Cp)_2$ | 1 | H | 3 |
| (8)  | Cu   | $OCH[CH(CH_3)_2]_2$ | C=S  | $Fe(Cp)_2$ | 1 | H | 3 |
| (9)  | VO   | $OCH[CH(CH_3)_2]_2$ | C=S  | $Fe(Cp)_2$ | 1 | H | 3 |
| (10) | TiO  | $OCH[CH(CH_3)_2]_2$ | C=S  | $Fe(Cp)_2$ | 1 | H | 3 |
| (11) | Ni   | $OCH[CH(CH_3)_2]_2$ | C=S  | $Fe(Cp)_2$ | 1 | H | 3 |
| (12) | Co   | $OCH[CH(CH_3)_2]_2$ | C=S  | $Fe(Cp)_2$ | 1 | H | 3 |
| (13) | Cu   | $OCH[CH(CH_3)_2]_2$ | C=O  | $Fe(Cp)_2$ | 1 | Br, H | 1, 2 |
| (14) | Zn   | $OCH[CH(CH_3)_2]_2$ | C=O  | $Fe(Cp)_2$ | 1 | Br, H | 1, 2 |
| (15) | Pd   | $OCH[CH(CH_3)_2]_2$ | C=O  | $Fe(Cp)_2$ | 1 | Br, H | 2, 1 |
| (16) | Cu   | $OCH[CH(CH_3)_2]_2$ | $SO_2$ | $Fe(Cp)_2$ | 1 | H | 3 |
| (17) | VO   | $OCH_2C(CH_3)_2$ | $SO_2$ | $Fe(Cp)_2$ | 1 | H | 3 |
| (18) | GaBr | $OCH_2C(CH_3)_2$ | $SO_2$ | $Fe(Cp)_2$ | 1 | H | 3 |
| (19) | Cu   | $OCH(CH_3)CH_2CH(CH_3)_2$ | C=O | $Fe(Cp)_2$ | 1 | H | 3 |
| (20) | VO   | $OCH(CH_3)CH_2CH(CH_3)_2$ | SO  | $Fe(Cp)_2$ | 1 | H | 3 |
| (21) | Rh   | $OCH(CH_3)CH_2CH(CH_3)_2$ | SO  | $Fe(Cp)_2$ | 1 | H | 3 |
| (22) | MO   | $OCH_2CH(C_2H_5)_2(CH_2)_3CH_3$ | C=NH | $Fe(Cp)_2$ | 1 | H | 3 |
| (23) | Cu   | $OCH_2CH(C_2H_5)_2(CH_2)_3CH_3$ | C=NH | $Fe(Cp)_2$ | 1 | H | 3 |
| (24) | VO   | $OCH_2CH(C_2H_5)_2(CH_2)_3CH_3$ | C=NH | $Fe(Cp)_2$ | 1 | H | 3 |
| (25) | VO   | $OCH_2CH_2CH(CH_3)_2$ | $C=NCH_3$ | $Fe(Cp)_2$ | 1 | H | 3 |
| (26) | Cu   | $OCH_2CH_2CH(CH_3)_2$ | $C=NCH_3$ | $Fe(Cp)_2$ | 1 | H | 3 |
| (27) | Ni   | $OCH_2CH_2CH(CH_3)_2$ | $C=NCH_3$ | $Fe(Cp)_2$ | 1 | H | 3 |
| (28) | MnOH | $OCH_2CH_2CH(CH_3)_2$ | C=NPh | $Fe(Cp)_2$ | 1 | H | 3 |
| (29) | $SiCl_2$ | $OCH_2CH_2CH(CH_3)_2$ | C=NPh | $Fe(Cp)_2$ | 1 | H | 3 |
| (30) | $ZrCl_2$ | $OCH_2CH_2CH(CH_3)_2$ | C=NPh | $Fe(Cp)_2$ | 1 | H | 3 |
| (31) | AlCl | $OCH_2CH_2CH(CH_3)_2$ | $C=NOCH_3$ | $Fe(Cp)_2$ | 1 | H | 3 |
| (32) | GaBr | $OCH_2CH_2CH(CH_3)_2$ | $C=NOCH_3$ | $Fe(Cp)_2$ | 1 | H | 3 |
| (33) | Cu   | $O(CH_2)_2N(CH_3)_2$ | $C=NOCH_3$ | $Fe(Cp)_2$ | 1 | H | 3 |
| (34) | VO   | $O(CH_2)_2N(C_2H_5)_2$ | C=NOH | $Fe(Cp)_2$ | 1 | H | 3 |
| (35) | Co   | $O(CH_2)_2N(C_2H_5)_2$ | C=NOH | $Fe(Cp)_2$ | 1 | H | 3 |
| (36) | InCl | $O(CH_2)_2N(C_2H_5)_2$ | C=NOH | $Fe(Cp)_2$ | 1 | H | 3 |
| (37) | Cu   | $C(CH_3)_3$ | C=O | $Fe(Cp)_2$ | 1 | H | 3 |
| (38) | VO   | $C(CH_3)_3$ | C=O | $Fe(Cp)_2$ | 1 | H | 3 |
| (39) | Ni   | $C(CH_3)_3$ | C=O | $Fe(Cp)_2$ | 1 | H | 3 |
| (40) | FeCl | $CH(CH_3)C_2H_5$ | C=S | $Fe(Cp)_2$ | 1 | H | 3 |
| (41) | Cu   | $CH(CH_3)C_2H_5$ | C=S | $Fe(Cp)_2$ | 1 | H | 3 |

TABLE 1-continued

Phthalocyanine Compounds (A)

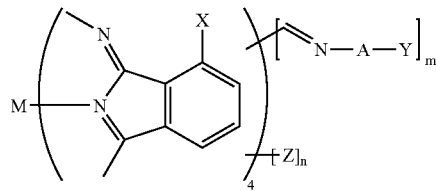

| Comp | M | X | A | Y | m | Z | n |
|---|---|---|---|---|---|---|---|
| (42) | VO | CH(CH₃)C₂H₅ | C=S | Fe(Cp)₂ | 1 | H | 3 |
| (43) | Co | C(CH₃)₂(CH₂)₄CH₃ | C=S | Fe(Cp)₂ | 1 | H | 3 |
| (44) | Sn | C(CH₃)₂(CH₂)₄CH₃ | C=S | Fe(Cp)₂ | 1 | H | 3 |
| (45) | Al—Ph | C(CH₃)₂(CH₂)₄CH₃ | C=S | Fe(Cp)₂ | 1 | H | 3 |
| (46) | In—Ph | C(CH₃)₂(CH₂)₄CH₃ | C=S | Fe(Cp)₂ | 1 | H | 3 |
| (47) | Cu | C(CH₃)₂(CH₂)₄HC₃ | C=S | Fe(Cp)₂ | 1 | H | 3 |
| (48) | VO | SCH(C₂H₅)₂ | SO₂ | Fe(Cp)₂ | 1 | H | 3 |
| (49) | Pd | SCH(C₂H₅)₂ | SO₂ | Fe(Cp)₂ | 1 | H | 3 |
| (50) | Cu | SCH(C₂H₅)₂ | SO₂ | Fe(Cp)₂ | 1 | H | 3 |
| (51) | Sn | S(CH₂)₇CH₃ | SO | Fe(Cp)₂ | 1 | H | 3 |
| (52) | VO | S(CH₂)₇CH₃ | SO | Fe(Cp)₂ | 1 | H | 3 |
| (53) | FeCl | S(CH₂)₇CH₃ | SO | Fe(Cp)₂ | 1 | H | 3 |
| (54) | Cu | S(CH₂)₂N(CH₃)₂ | C=NH | Fe(Cp)₂ | 1 | H | 3 |
| (55) | Ni | S(CH₂)₂N(CH₃)₂ | C=NH | Fe(Cp)₂ | 1 | H | 3 |
| (56) | Rh | S(CH₂)₂N(CH₃)₂ | C=NH | Fe(Cp)₂ | 1 | H | 3 |
| (57) | VO | OPhC(CH₃)₃ | C=NCH₃ | Fe(Cp)₂ | 1 | H | 3 |
| (58) | Cu | OPhC(CH₃)₃ | C=NCH₃ | Fe(Cp)₂ | 1 | H | 3 |
| (59) | Zn | OPhC(CH₃)₃ | C=NCH₃ | Fe(Cp)₂ | 1 | H | 3 |
| (60) | VO | SPhC(CH₃)₃ | C=NPh | Fe(Cp)₂ | 1 | H | 3 |
| (61) | Cu | SPhC(CH₃)₃ | C=NPh | Fe(Cp)₂ | 1 | H | 3 |
| (62) | Pd | SPhC(CH₃)₃ | C=NPh | Fe(Cp)₂ | 1 | H | 3 |
| (63) | VO | SPhN(CH₃)₂ | C=NOH | Fe(Cp)₂ | 1 | H | 3 |
| (64) | Cu | SPhN(CH₃)₂ | C=NOH | Fe(Cp)₂ | 1 | H | 3 |
| (65) | Ni | SPhN(CH₃)₃ | C=NOH | Fe(Cp)₂ | 1 | H | 3 |
| (66) | Cu | OCH[CH(CH₃)₂]₂ | C=O | Ru(Cp)₂ | 1 | H | 3 |
| (67) | VO | OCH[CH(CH₃)₂]₂ | C=O | Ni(Cp)₂ | 1 | H | 3 |
| (68) | FeCl | OCH[CH(CH₃)₂]₂ | C=O | Co(Cp)₂ | 1 | H | 3 |
| (69) | Pd | OCH[CH(CH₃)₂]₂ | C=O | W(Cp)₂ | 1 | H | 3 |
| (70) | Zn | OCH[CH(CH₃)₂]₂ | C=O | Er(Cp)₂ | 1 | H | 3 |
| (71) | Sn | OCH[CH(CH₃)₂]₂ | C=O | Cr(Cp)₂ | 1 | H | 3 |
| (72) | Ni | OCH[CH(CH₃)₂]₂ | C=S | Ti(Cp)₂(OPh)₂ | 1 | H | 3 |
| (73) | Cu | OCH[CH(CH₃)₂]₂ | C=S | La(Cp)₃ | 1 | H | 3 |
| (74) | VO | OCH[CH(CH₃)₂]₂ | C=S | Sc(Cp)₃ | 1 | H | 3 |
| (75) | Cu | OCH[CH(CH₃)₂]₂ | SO₂ | Sc(Cp)₃ | 1 | H | 3 |
| (76) | VO | OCH[CH(CH₃)₂]₂ | SO₂ | Er(Cp)₂ | 1 | H | 3 |
| (77) | FeCl | OCH[CH(CH₃)₂]₂ | SO₂ | W(Cp)₂ | 1 | H | 3 |
| (78) | Cu | OCH[CH(CH₃)₂]₂ | C=O | Co(Cp)₂ | 1 | Br, H | 1, 2 |
| (79) | VO | OCH[CH(CH₃)₂]₂ | C=O | Fe(Cp)₂ | 1 | Br, H | 1, 2 |
| (80) | Pd | OCH[CH(CH₃)₂]₂ | C=O | Er(Cp)₂ | 1 | Br, H | 1, 2 |
| (81) | Cu | OCH[CH(CH₃)₂]₂ | C=S | Fe(Cp)₂ | 1 | Br, H | 1, 2 |
| (82) | VO | OCH[CH(CH₃)₂]₂ | C=S | W(Cp)₂ | 1 | Br, H | 1, 2 |
| (83) | Ni | OCH[CH(CH₃)₂]₂ | C=S | Sc(Cp)₃ | 1 | Br, H | 1, 2 |
| (84) | Cu | OCH[CH(CH₃)₂]₂ | SO₂ | Fe(Cp)₂ | 1 | Br, H | 1, 2 |
| (85) | VO | OCH[CH(CH₃)₂]₂ | SO₂ | Fe(Cp)₂ | 1 | Br, H | 1, 2 |
| (86) | Pb | OCH[CH(CH₃)₂]₂ | SO₂ | Co(Cp)₂ | 1 | Br, H | 1, 2 |
| (87) | Pd | OCH[CH(CH₃)₂]₂ | C=NH | Fe(Cp)₂ | 1 | Br, H | 1, 2 |
| (88) | Cu | OCH[CH(CH₃)₂]₂ | C=NH | La(Cp)₃ | 1 | Br, H | 1, 2 |
| (89) | Co | OCH[CH(CH₃)₂]₂ | C=NH | Ti(Cp)₂(OPh)₂ | 1 | Br, H | 1, 2 |
| (90) | InCl | SPhC(CH₃)₃ | C=O | Fe(Cp)₂ | 1 | Br, H | 1, 2 |
| (91) | VO | SPhC(CH₃)₃ | C=O | Fe(Cp)₂ | 1 | Br, H | 1, 2 |
| (92) | Cu | SPhC(CH₃)₃ | C=O | Fe(Cp)₂ | 1 | Br, H | 1, 2 |
| (93) | Ni | SPhC(CH₃)₃ | C=S | Co(Cp)₂ | 1 | Br, H | 1, 2 |
| (94) | Pb | SPhC(CH₃)₃ | C=S | Sc(Cp)₃ | 1 | Br, H | 1, 2 |
| (95) | FeCl | SPhC(CH₃)₃ | C=S | W(Cp)₂ | 1 | Br, H | 1, 2 |
| (96) | VO | SPhC(CH₃)₃ | SO₂ | Fe(Cp)₂ | 1 | Br, H | 1, 2 |
| (97) | Cu | SPhC(CH₃)₃ | SO₂ | La(Cp)₃ | 1 | Br, H | 1, 2 |
| (98) | Co | SPhC(CH₃)₃ | SO₂ | Er(Cp)₂ | 1 | Br, H | 1, 2 |
| (99) | AlCl | SPhC(CH₃)₃ | SO₂ | Ti(Cp)₂(OPh)₂ | 1 | Br, H | 1, 2 |
| (100) | TiO | SPhC(CH₃)₃ | SO₂ | Ti(Cp)₂(OPh)₂ | 1 | Br, H | 1, 2 |
| (101) | Cu | OCH[CH(CH₃)₂]₂ | C=O | Fe(Cp)₂ | 2 | H | 2 |
| (102) | VO | OCH[CH(CH₃)₂]₂ | C=O | Fe(Cp)₂ | 2 | H | 2 |
| (103) | Cu | OCH[CH(CH₃)₂]₂ | C=S | Fe(Cp)₂ | 2 | H | 2 |

TABLE 1-continued

Phthalocyanine Compounds (A)

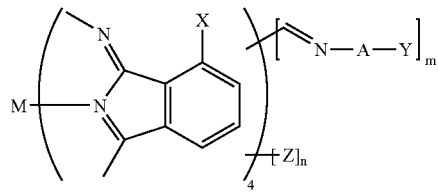

| Comp | M | X | A | Y | m | Z | n |
|---|---|---|---|---|---|---|---|
| (104) | VO | OCH[CH(CH$_3$)$_2$]$_2$ | C=S | Fe(Cp)$_2$ | 2 | H | 2 |
| (105) | Cu | OCH[CH(CH$_3$)$_2$]$_2$ | SO$_2$ | Fe(Cp)$_2$ | 2 | H | 2 |

TABLE 2

Phthalocyanine Compounds (B)

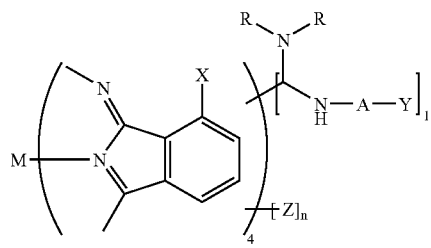

| Comp | M | X | A | Y | R | l | Z | n |
|---|---|---|---|---|---|---|---|---|
| (106) | Cu | OCH[CH(CH$_3$)$_2$]$_2$ | C=O | Fe(Cp)$_2$ | CH$_3$, Ph | 1 | H | 3 |
| (107) | Cu | OCH[CH(CH$_3$)$_2$]$_2$ | C=O | Fe(Cp)$_2$ | CH$_3$, CH$_3$ | 1 | H | 3 |
| (108) | Cu | OCH[CH(CH$_3$)$_2$]$_2$ | C=S | Fe(Cp)$_2$ | CH$_3$, Ph | 1 | H | 3 |
| (109) | Cu | OCH[CH(CH$_3$)$_2$]$_2$ | C=S | Fe(Cp)$_2$ | CH$_3$, CH$_3$ | 1 | H | 3 |
| (110) | Pd | OCH[CH(CH$_3$)$_2$]$_2$ | C=O | Fe(Cp)$_2$ | CH$_3$, Ph | 1 | H | 3 |
| (111) | Pd | OCH[CH(CH$_3$)$_2$]$_2$ | C=S | Fe(Cp)$_2$ | CH$_3$, Ph | 1 | H | 3 |
| (112) | Pd | OCH[CH(CH$_3$)$_2$]$_2$ | C=O | Fe(Cp)$_2$ | CH$_3$, Ph | 1 | H, Br | 2, 1 |

TABLE 3

Phthalocyanine Compounds (C)

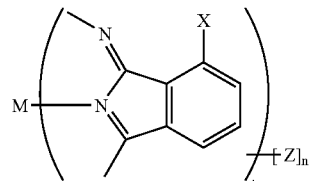

| Comp | M | X | Z | n |
|---|---|---|---|---|
| (113) | Cu | OCH[CH(CH$_3$)$_2$]$_2$ | H | 4 |
| (114) | Cu | OCH[CH(CH$_3$)$_2$]$_2$ | H, Br | 3, 1 |
| (115) | Cu | OCH[CH(CH$_3$)$_2$]$_2$ | H, Br | 2, 2 |
| (116) | Pd | OCH[CH(CH$_3$)$_2$]$_2$ | H | 4 |
| (117) | Pd | OCH[CH(CH$_3$)$_2$]$_2$ | H, Br | 3, 1 |
| (118) | Pd | OCH[CH(CH$_3$)$_2$]$_2$ | H, Br | 2, 2 |
| (119) | Cu | OCH[CH(CH$_3$)$_2$]$_2$ | H, NO$_2$ | 3, 1 |

TABLE 4

Mixtures of Phthalocyanine Compounds

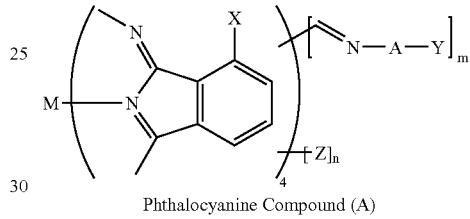

Phthalocyanine Compound (A)

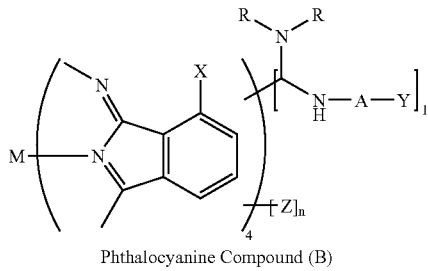

Phthalocyanine Compound (B)

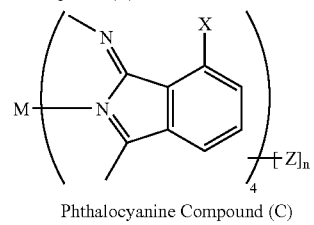

Phthalocyanine Compound (C)

| Mixture | Phthalocyanine Compound (A) | Phthalocyanine Compound (B) | Phthalocyanine Compound (C) | Mixing Ratio (LC), (A)/(B)/(C) |
|---|---|---|---|---|
| (120) | (1) & (101) | (106) | (113) | 62/11/24 |
| (121) | (1) & (101) | (106) | (113) | 45/10/44 |
| (122) | (2) | (110) | (116) | 80/8/11 |
| (123) | (2) | (110) | (116) | 61/10/26 |
| (124) | (15)* | (112)* | (118)* | 50/5/47* |
| (125) | (8) & (103) | (108) | (113) | 68/14/15 |

*Compounds different in bromination degree are also included.

[Optical Information Recording Media]

The optical information recording media of the present invention is made up of: a transparent substrate in which a pre-groove (a guide groove) is formed as needed; a recording layer provided on the substrate for absorbing laser beams to form pits therein; a reflecting layer provided on the recording layer for increasing the reflectance of the recording layer; and a protective layer provided on the reflecting layer for protecting the recording layer and the reflective layer. The protective layer may be used as an adhesion layer to provide an optical information recording media having a 2-layer bonding structure.

For the above substrate, any materials can be used as long as they substantially transmit semiconductor laser beams and are being used in ordinary optical recording media. For example, macromolecular materials such as polycarbonate resin, acrylic resin, polystyrene resin, vinyl chloride resin, epoxy resin, polyester resin and amorphous polyolefin resin, or inorganic materials such as glass can be used. Depending on the situation, polycarbonate resin etc. is formed into a substrate with a pre-groove formed therein by injection molding or 2P method. The substrate may take the form of a plate, film, disk or card. The substrate may have a guide groove for showing the position of recording, a pit for showing the position of recording or a pit for partly read only information on its substrate.

The recording layer of the present invention contains the phthalocyanine compounds/mixtures of the present invention whose $\lambda$max is around 650 nm to 900 nm.

Generally, organic dyes are characterized by large change in refractive index n and extinction coefficient k with wavelength $\lambda$. If the refractive index n at a laser wavelength is smaller than 1.8, reflectance and signal modulation ratio required for signal reading cannot be obtained, and when k is more than 0.40, reflectance is lowered, whereby satisfactory read signals cannot be obtained, and moreover, signals are susceptible to change due to the read light; thus, dyes having such refractive index n and extinction coefficient k are not suitable for practical applications. Media with high reflectance and sensitivity can be produced by, taking into consideration the above described characteristics of dyes, selecting organic dyes which have preferable optical constants at intended laser light wavelengths and forming a recording layer using the same.

The phthalocyanine compounds/mixtures of the present invention, which are used in the present invention, are very useful compounds that meet the above described optical constants required for a recording layer to have at the above described laser wavelengths (n is 1.8 or more and k is in the range of 0.04 to 0.40, preferably n is 2.0 or more and k is in the range of 0.04 to 0.20), since they each have a high optical absorption coefficient and their absorption wavelength region can be arbitrarily selected by selecting their central metal or substituents.

The content of the phthalocyanine compounds/mixtures of the present invention in the recording layer is 30% or more and preferably 60% or more. That the content is substantially 100% is also preferable.

The recording layer of the optical information recording media of the present invention can be formed by the method such as spin coat, evaporation or sputtering; however, from the viewpoints of easiness of film forming and of controlling the pigment layer thickness at the groove portion and land portion, the spin coat method is preferable.

When adopting a coating method such as spin coat method, a coating fluid is used in which the phthalocyanine compound/mixture of the present invention is dissolved or dispersed so that its content in the fluid is 1 to 40% by weight and preferably 3 to 30% by weight. In this case, a solvent is used which will not damage the substrate of the medium. Such solvents include: non-polar solvents, for example, aliphatic or alicyclic hydrocarbons such as hexane, heptane, octane, decane, cyclohexane, methylcyclohexane, ethylcyclohexane, dimethylcyclohexane, isopropylcyclohexane, cycloheptane and cyclooctane; and ethereal solvents such as diethyl ether, dibutyl ether, diisobutyl ether, diisopropyl ether and dipentyl ether; and alcoholic polar solvents such as methyl alcohol, ethyl alcohol, isopropyl alcohol, 3-hydroxy-3-methyl-2-butanone, diacetone alcohol, fluorine alcohol, allyl alcohol and methyl cellosolve. These solvents may be used alone, or two or more kinds in combination.

When adding a second solvent, solvents such as benzene, toluene, xylene, styrene, ethyl benzene, butyl benzene, cumene, trimethyl benzene, triethyl benzene, tetralin, p-cymene, methyl isobutyl ketone and diisobutyl ketone are preferably used, because they have a satisfactory leveling function to the substrate groove. The mixing ratio of the second solvent to the coating fluid is preferably in the range of 0.1 to 20% by volume. The mixing ratios in this range are optimal ones which provide a sufficient compatibility for pigments and mixed solvents, do not damage the substrate, and provide an excellent shape of the pigment film to the substrate groove.

When a solvent that does not damage the substrate cannot be selected, a method such as sputtering, chemical evaporation or vacuum evaporation can be effectively used.

Preferably, the film thickness of the recording layer is, not limited to, 30 nm to 300 nm. If the film thickness is less than 30 nm, distortion is caused in the recording signals, and besides, the signal amplitude decreases. If the film thickness is more than 300 nm, the sensitivity is lowered, the high-speed recording characteristics deteriorate, and the read signal characteristics also deteriorate.

When coating is carried out using the above described mixed solvents in the present invention, it is preferable to use a substrate whose groove is 150 nm or more deep and 650 nm or more wide.

A drying step may be provided after the formation of the recording layer, depending on the situation. In terms of the productivity of media and the stability of the recording signal characteristics of media, the drying temperature is preferably 20° C. or more and 100° C. or less. The drying method can be selected from among air-drying, hot-air drying and drying by far infrared irradiation and the drying time is usually about 10 seconds to 2 hours. The drying may be carried out at atmospheric pressure or under reduced pressure.

A reflecting layer is provided on the recording layer of the optical information recording media in accordance with the present invention. The reflecting layer may be a film which has, for example, heat insulating and light enhancing functions in addition to the reflecting function. In such a case, the reflecting layer may have a multi-layer structure made up of two or more layers. Concrete examples of such reflecting layers are those of aluminum, gold, silver, copper, platinum, nickel and the alloys in which each said metals are at least one component. The thickness of the reflecting layer is usually 20 to 200 nm. An inorganic film of, for example, aluminum oxide, silicon oxide, silicon nitride, aluminum nitride, boron nitride, magnesium fluoride or silicon carbide may be provided as a second layer which performs heat insulating and light enhancing functions. Methods of forming a reflecting layer include, for example, sputtering, ion plating, chemical evaporation and vacuum evaporation.

A protective layer is provided on the reflecting layer of the optical information recording medium in accordance with the present invention. The protective layer is not limited to any specific one as long as it can protect the recording layer and the reflecting layer. Macromolecular materials such as polycarbonate, acryl, polystyrene, vinyl chloride, epoxy and polyester or inorganic materials such as $SiO_2$, $Al_2O_3$ and AlN can be used for the protective layer. Of the above materials, ultraviolet curing acrylic resins are preferable because the use of them makes it easy to form a protective layer. Concrete examples of ultraviolet cured acrylic resins include urethane acrylate, epoxy acrylate and polyester acrylate. These may be alone or in combination. The protective layer may be a multi-layer of two or more layers laminated. Methods of forming a protective layer include, for example, coating methods such as spin coat and cast, sputtering and chemical evaporation, similar to those for the recording layer. Of these methods, spin coat method is preferable.

The thickness of the protective layer is usually in the range of 0.1 µm to 100 µm; however, in the present invention the thickness is preferably 3 µm to 30 µm.

A label etc. can be printed on the protective layer. Further, means may be used of bonding a protective sheet or a substrate to the surface of the reflecting layer or bonding two optical recording media to each other with their inside facing each other. And a thin film of ultraviolet curing resin or inorganic material may be formed on the mirror surface of the substrate to protect the surface or prevent dust etc. from sticking on the same.

The optical information recording medium of the present invention records and reads signals generated when it is exposed to laser beams. In such record and read, semiconductor laser whose oscillation wavelength is in the range of 770 to 830 nm is used for CD-R. When taking into consideration the compatibility with CD players, it is usual to read with a semiconductor laser whose oscillation wavelength is in the range of 770 to 830 nm. However, the phthalocyanine dyes of the present invention have their absorption at 300 to 450 nm as well, and thus recording at high speeds and in a short time is possible outside the range of 770 to 830 nm, even with a blue semiconductor laser whose oscillation wavelength is in the range of 400 to 600 nm.

Since the object of the present invention is to improve the sensitivity of optical information recording medium and reduce the jitter value of the same at high-speed recording, it is important to measure the sensitivity and the jitter value.

Thus, the inventors focused their attention on the recording laser power (sensitivity) and the jitter value around BETA=0% (BETA is an index of recording laser power, defined in orange Book Standard) and evaluated the same.

In the following the present invention will be described in detail giving several examples; however, it is to be understood that these examples are not intended to limit the present invention.

EXAMPLE 1

Synthesis of Phthalocyanine Compound (Concrete Example Mixture (120))

In a reaction vessel under a stream of dry nitrogen, 6.5 g (6.26 mmol) of tetra-(α-2,4-dimethyl-3-pentyloxy)copper phthalocyanine prepared in accordance with the method described in Japanese Patent Laid-Open No. 5-247363 was dissolved in 32 mL of toluene, 5.08 g (37.6 mmol) of N-methylformanilide was added, 5.76 g (37.56 mmol) of phosphoryl chloride was added dropwise over 5 minutes, and the mixture was stirred at 45 to 50° C. for 20 hours. Then, ammonia gas was blown through the mixture for 6 hours (20 mL/min) while cooling the mixture in an ice bath to 5° C. or less, the inorganic salt by-produced was filtered out, 4.3 g (18.8 mmol) of ferrocene carboxylic amide was added, and the mixture was refluxed for 4 hours. The reaction solution was cooled to room temperature, the insoluble matter was filtered out, the organic layer was rinsed with water and concentrated, methanol was added, and the precipitated green solid matter was filtered out to yield 5.3 g of green powder of phthalocyanine mixture (120) shown as a concrete example.

The mixture was analyzed by liquid chromatography, and the result was that the mixture contained 58% of concrete example compound (1), 4% of concrete example compound (101), 11% of concrete example compound (106) and 24% of concrete example compound (113) (% shows area ratio in LC analysis).

The maximum absorption wavelength (λmax) and gram absorption coefficient (εg) of the compound in a toluene solution, and the optical constants (refractive index and extinction coefficient) at 780 nm and the pyrolytic temperature of the compound were as follows:

λmax: 716.5 nm
εg: 142000 mL/g·cm
refractive index (780 nm): 2.31
extinction coefficient (780 nm): 0.12
inflection point of pyrolysis (TGA): 345° C.

EXAMPLE 2

Twenty g of the phthalocyanine mixture (120) obtained in Example 1 was column-purified to obtain 8.2 g of phthalocyanine compound shown as concrete example compound (1).

The maximum absorption wavelength (λmax) and gram absorption coefficient (εg) of the compound in a toluene solution, and the optical constants (refractive index and extinction coefficient) at 780 nm of the compound were as follows:

λmax: 719.5 nm
εg: 152000 mL/g·cm
refractive index (780 nm): 2.20
extinction coefficient (780 nm): 0.14

EXAMPLE 3

Twenty g of the phthalocyanine mixture (120) obtained in Example 1 was column-purified to obtain 1.8 g of phthalocyanine compound shown as concrete example compound (106).

The maximum absorption wavelength (λmax) and gram absorption coefficient (εg) of the compound in a toluene solution, and the optical constants (refractive index and extinction coefficient) at 780 nm of the compound were as follows:

λmax: 717.5 nm
εg: 163000 mL/g·cm
refractive index (780 nm): 2.28
extinction coefficient (780 nm): 0.10

EXAMPLE 4

Synthesis of Phthalocyanine Compound (Concrete Example Mixture (125))

The same operations as in Example 1 were performed except that 4.3 g (18.8 mmol) of ferrocene thiocarboxylic amide was used instead of ferrocene carboxylic amide to yield a phthalocyanine mixture containing 5.9 g of phthalocyanine mixture (125) shown as a concrete example.

The maximum absorption wavelength (λmax) and gram absorption coefficient (εg) of the compound in a toluene solution, and the optical constants (refractive index and extinction coefficient) at 780 nm and the pyrolytic temperature of the mixture were as follows:
λmax: 718 nm
εg: 134000 mL/g·cm
refractive index (780 nm): 2.24
extinction coefficient (780 nm): 0.14
inflection point of pyrolysis (TGA): 245, 355° C.

The mixture was subjected to LC analysis, and the result was that the mixture contained 62% of concrete example compound (8), 6% of concrete example compound (103), 14% of concrete example compound (108) and 15% of concrete example compound (113).

EXAMPLE 5

Synthesis of Phthalocyanine Compound (Concrete Example Mixture (124))

The same operations as in Example 1 were performed except that 7.2 g (6.3 mmol) of brominated-[tetra-(α-2,4-dimethyl-3-pentyloxy)palladium phthalocyanine] prepared in accordance with the method described in Japanese Patent Laid-Open No. 5-247363 was used instead of 6.5 g of tetra-(α-2,4-dimethyl-3-pentyloxy)copper phthalocyanine to yield 5.7 g of green powder of phthalocyanine mixture (124) shown as a concrete example in Table 4.

The maximum absorption wavelength (λmax) and gram extinction coefficient (εg) of the mixture in a toluene solution were as follows:
λmax: 719 nm
εg: 125000 mL/g·cm

EXAMPLE 6

Synthesis of Phthalocyanine Compound (Concrete Example Compound (16))

The same operations as in Example 1 were performed except that 5.04 g (19 mmol) of ferrocene sulfonic amide was used instead of ferrocene carboxylic amide to yield 3.8 g of green powder of phthalocyanine mixture which contained a concrete example compound (16).

The maximum absorption wavelength (λmax) and gram extinction coefficient (εg) of the mixture in a toluene solution were as follows:
λmax: 726, 707 nm
εg: 104000 mL/g·cm

EXAMPLE 7

Synthesis of Phthalocyanine Compound (Concrete Example Compound (19))

The same operations as in Example 1 were performed except that 7.2 g (6.3 mmol) of tetra-(α-2,4-dimethyl-3-pentyloxy)palladium phthalocyanine was used instead of 6.5 g of tetra-(α-2,4-dimethyl-3-butoxy)copper phthalocyanine to yield 2.6 g of green powder of phthalocyanine mixture which contained concrete example compound (19).

The maximum absorption wavelength (λmax) and gram extinction coefficient (εg) of the mixture in a toluene solution were as follows:
λmax: 712 nm
εg: 110000 mL/g·cm

EXAMPLE 8

The same operations as in Example 1 were performed except that 2.8 g of N,N-dimethylformamide was used instead of 5.08 g of N-methylformanilide and after the dropwise addition of phosphryl chloride, reaction was allowed to progress for 20 hours at 70 to 80° C. to yield 4.1 g of green powder of phthalocyanine mixture which contained concrete example compound (1).

The mixture was subjected to LC analysis, and the result was that the mixture contained 45% of concrete example compound (1), 10% of concrete example compound (106) and 44% of concrete example compound (113).

The maximum absorption wavelength (λmax) and gram extinction coefficient (εg) of the mixture in a toluene solution were as follows:
λmax: 713.8 nm
εg: 162000 mL/g·cm
refractive index (780 nm): 2.22
extinction coefficient (780 nm): 0.13

EXAMPLE 9

A coating fluid was prepared by dissolving 0.9 g of phthalocyanine mixture (120) synthesized in Example 1 in 50 ml of mixed solution which was obtained by adding 2 ml of pseudocumene (Cosmo Matsuyama Oil Co., Ltd.), as a second organic solvent, to 50 ml of dimethylcyclohexane (IWATANI INDUSTRIAL GASES CORP.). This coating fluid was spin coated on an injection-molded polycarbonate substrate (outside diameter: 120 mm, thickness: 1.2 mm) with a spiral groove (pitch: 1.6 μm, groove width: 0.7 μm, groove depth 180 nm) to form a recording layer so that Abs (absorbance of the recording layer)=0.50. Then, the substrate on which the recording layer was formed was dried at 70° C. for 2 hours to remove the residual solvent in the pigments. After that, Ag was sputtered on the recording layer with sputtering apparatus (CDI-900) manufactured by Balzers so that the thickness of Ag film was about 70 nm to form a reflecting layer. An ultraviolet curing resin "SD-1700" (Dainippon Ink and Chemicals, Inc.) was then spin coated on the reflecting layer and the coating was exposed to ultra violet rays for curing to form a protective layer 6 μm thick.

Recording was performed at a linear velocity of 38.4 m/s (EFM record) on the optical recording medium thus produced using a 32x speed optical disk recording system (laser wavelength: around 780 nm, NA=about 0.5) manufactured by Sanyo Electric Co., Ltd., and the jitter and the modulation ratio at the time of reading on a optical disk evaluating apparatus DDU-1000 (PULSTEC INDUSTRIAL Co., Ltd. laser wavelength: 781 nm, NA=0.45, an optical head mounted on a commercially available CD player was used) were measured with a LJM-1851 jittermeter (LEADER ELECTRONICS CORP.) and a CD-decoder: DR3552 manufactured by Kenwood Corporation, DIGITAL STORAGE OSCILLOSCOPE VC-6100 manufactured by Hitachi, Ltd., and TIA-175 Timing Interval Analyzer manufactured by ADC. The evaluations are shown in Table 5.

Satisfactory recording sensitivity, recording laser power=43.0 mW at BETA=0%, and satisfactory jitter characteristics were obtained, and excellent recording and reading could be performed with 32x high-speed record characteristics. The compatibility of this medium with various types of CD players was also excellent.

EXAMPLE 10

Medium Production and Evaluation of Recording Characteristics

An optical recording medium was produced in the same manner as in Example 9 using the phthalocyanine mixture (125) synthesized in Example 4.

The optical recording medium produced was evaluated for its recording and reading at 32× speed in the same manner as in Example 9.

Satisfactory recording sensitivity, recording laser power=42.0 mW at BETA=0%, and satisfactory jitter characteristics were obtained, and excellent recording and reading could be performed with 32× high-speed record characteristics. The compatibility of this medium with various types of CD players was also excellent.

EXAMPLE 11

An optical recording medium was produced in the same manner as in Example 9 using the phthalocyanine mixture (124) synthesized in Example 5 and evaluated for its recording and reading at 32× speed.

Satisfactory recording sensitivity, recording laser power=43.0 mW at BETA=0%, and satisfactory jitter characteristics were obtained, and excellent recording and reading could be performed with 32× high-speed record characteristics. The compatibility of this medium with various types of CD players was also excellent.

COMPARATIVE EXAMPLE 1

A monoformylphthalocyanine compound was obtained first by performing formylation of tetra-(α-2,4-dimethyl-3-pentyloxy)palladium phthalocyanine, and then through the step of extraction and column purification, in accordance with the processes disclosed in WO 98/14520 and WO 00/09522. The monoformylphthalocyanine compound was then brominated, subjected to reduction reaction by sodium boronhydride, and column purified to obtain a brominated-monoformylphthalocyanine compound. Then the compound was esterified using ferrocene carbonyl chloride to synthesize a phthalocyanine pigment having the following structural formula (Comp-1) which is described in WO 00/09522.

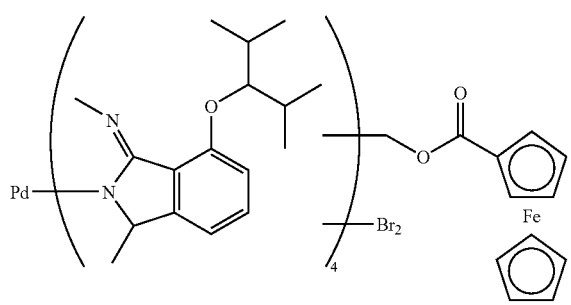

(Comp-1)

As described above, the synthesis of this compound required a multiple steps.

A recording layer was formed in the same manner as in Example 9 using this compound by spin coat method, and a reflecting layer and a protective layer were formed on the recording layer in this order to produce an optical recording medium.

This medium was evaluated for its recording and reading at 32× speed. The recording laser power=48 mW at BETA=0%. This indicates that the recording sensitivity was lower in the medium of this Comparative Example than those in Examples 9 to 11.

COMPARATIVE EXAMPLE 2

A monoformylphthalocyanine compound was obtained by using tetra-(α-2,4-dimethyl-3-pentyloxy)copper phthalocyanine, and then the monoformylphthalocyanine compound was subjected to reduction reaction by sodium boronhydride, and column purified to obtain a monohydroxyphthalocyanine compound, in the same manner as in Comparative Example 1. Then the compound was esterified using ferrocene carbonyl chloride to synthesize a phthalocyanine pigment having the following structural formula (Comp-2). As described above, the synthesis of this compound required a multiple steps.

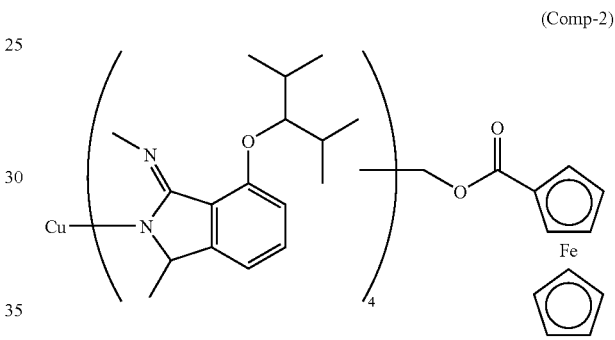

(Comp-2)

A recording layer was formed in the same manner as in Example 9 using this compound by spin coat method, and a reflecting layer and a protective layer were formed on the recording layer in this order to produce an optical recording medium.

This medium was evaluated for its recording and reading at 32× speed. The recording laser power=46 mW at BETA=0%. This indicates that the recording sensitivity was lower in the medium of this Comparative Example than those in Examples 9 to 11.

EXAMPLES 12-21

Optical recording media were produced in the same manner as in Example 9 using the compounds synthesized in the same manner as in Example 1 and evaluated for their recording and reading at 32× speed.

The results, including those of Examples 9 to 11, are shown in Table 5.

TABLE 5

| | at BETA = 0% | | | at BETA = 10% | | | |
| --- | --- | --- | --- | --- | --- | --- | --- |
| | Recording Laser Power (Sensitivity) | Jitter 3T Pit | 3T Land | Recording Laser Power (Sensitivity) | Jitter 3T Pit | 3T Land | Example No. Compound/ Mixture |
| Ex. 9 | ○ | ○ | ○ | ○ | ○ | ○ | (120) |
| Ex. 10 | ○ | ○ | ○ | ○ | ○ | ○ | (125) |

TABLE 5-continued

| | at BETA = 0% | | | at BETA = 10% | | | Example No. Compound/ Mixture |
|---|---|---|---|---|---|---|---|
| | Recording Laser Power (Sensitivity) | Jitter 3T Pit | Jitter 3T Land | Recording Laser Power (Sensitivity) | Jitter 3T Pit | Jitter 3T Land | |
| Ex. 11 | ○ | ○ | ○ | ○ | ○ | ○ | (124) |
| Ex. 12 | ○ | ○ | ○ | ○ | ○ | ○ | (121) |
| Ex. 13 | ○ | ○ | ○ | ○ | ○ | ○ | (1) |
| Ex. 14 | ○ | ○ | ○ | ○ | ○ | ○ | (8) |
| Ex. 15 | ○ | ○ | ○ | ○ | ○ | ○ | (106) |
| Ex. 16 | ○ | ○ | ○ | ○ | ○ | ○ | (108) |
| Ex. 17 | ○ | ○ | ○ | ○ | ○ | ○ | (50) |
| Ex. 18 | ○ | ○ | ○ | ○ | ○ | ○ | (66) |
| Ex. 19 | ○ | ○ | ○ | ○ | ○ | ○ | (87) |
| Ex. 20 | ○ | ○ | ○ | ○ | ○ | ○ | (89) |
| Ex. 21 | ○ | ○ | ○ | ○ | ○ | ○ | (103) |
| Comp Ex. 1 | x | x | x | x | x | x | |
| Comp Ex. 2 | x | ○ | ○ | x | x | x | |

Sensitivity ○: < 46 mW x: ≧ 46 mW
Jitter ○: ≦ 35 ns x: >35 ns

The invention claimed is:

1. A phthalocyanine compound represented by the following general formula (I):

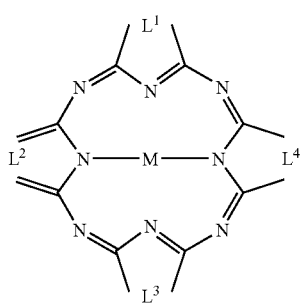

(I)

wherein in formula (I), M is two hydrogen atoms, a divalent metal atom, a mono-substituted trivalent metal atom, a di-substituted tetravalent metal atom, or an oxymetal, and $L^1$, $L^2$, $L^3$ and $L^4$ are each independently formula (a), formula (b), or formula (c):

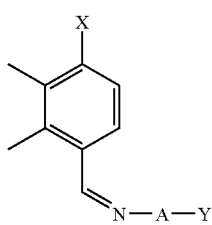

(a)

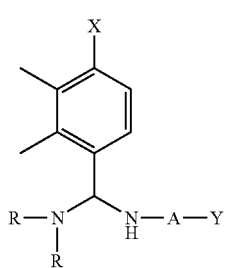

(b)

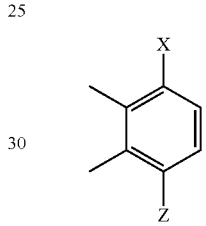

(c)

in formula (a), formula (b), and formula (c), X represents a substituted or unsubstituted alkyl group, alkoxy group, alkylthio group, aryloxy group, and arylthio group, Rs are each independently a hydrogen atom, a substituted or unsubstituted alkyl group with 1-6 of total carbon numbers, a substituted or unsubstituted aryl group with 6-10 of total carbon numbers, A represents a carbonyl group, a thiocarbonyl group, a sulfone group, a sulfine group, or a carboimidoyl group, Y represents a metal compound residue, and Z represents independently a hydrogen atom, a nitro group, or a halogen atom, and at least one of $L^1$-$L^4$ is formula (a) or (b).

2. The phthalocyanine compound according to claim 1, wherein in the afore-mentioned formula (I), M is Cu, and at least one of the above $L^1$-$L^4$ represents formula (a-1) and at least one of the above $L^1$-$L^4$ represents formula (c-1):

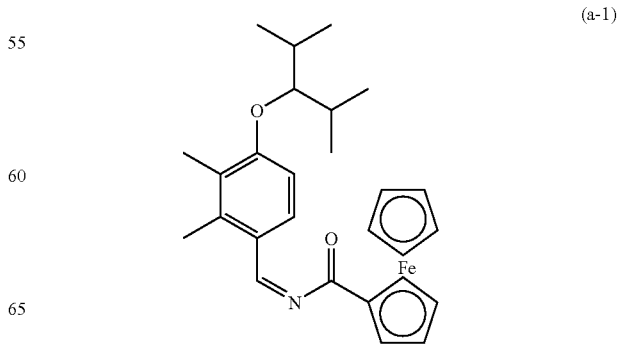

(a-1)

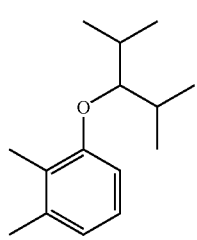  (c-1)

3. The phthalocyanine compound according to claim 1, wherein in the afore-mentioned formula (I), M is Cu, at least one of the above $L^1$ to $L^4$ represents formula (b-1), and at least one of the above $L^1$ to $L^4$ represents formula (c-1):

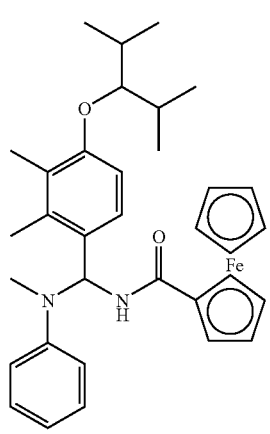  (b-1)

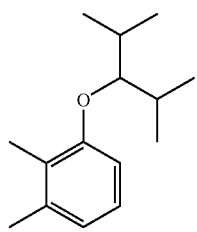  (c-1)

4. A mixture comprising phthalocyanine compounds represented by the following general formula (II):

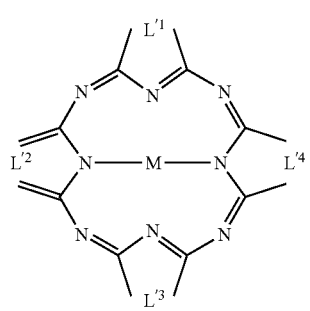  (II)

wherein in formula (II), M represents two hydrogen atoms, a divalent metal atom, a mono-substituted trivalent metal atom, a di-substituted tetravalent metal atom or an oxymetal; $L'^1$, $L'^2$, $L'^3$ and $L'^4$ are each independently formula (a), formula (b), or formula (c):

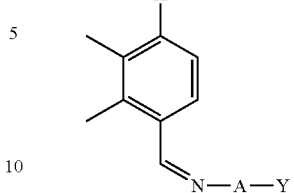  (a)

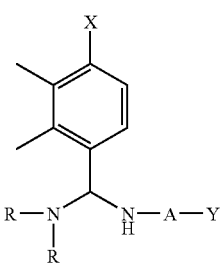  (b)

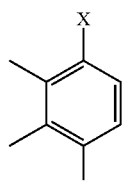  (c)

wherein in formulas (a), (b), and (c), X represents a substituted or unsubstituted alkyl, alkoxy, alkylthio, aryloxy or arylthio group; Rs are each independently a hydrogen atom, a substituted or unsubstituted alkyl group with 1-6 of total carbon numbers, a substituted or unsubstituted aryl group with 6-10 of total carbon numbers, A represents a carbonyl group, a thiocarbonyl group, a sulfone group, a sulfine group, or a carboimidoyl group; Y represents a metal compound residue; and Z independently represents a hydrogen atom, a nitro group or a halogen atom, provided that a mixture consisting of only phthalocyanine compounds in which all of the $L'^1$ to $L'^4$ are formula (c) is excluded.

5. A process for preparing the phthalocyanine mixture according to claim 4, which comprises the steps of:

reacting a phthalocyanine compound represented by the following general formula (III):

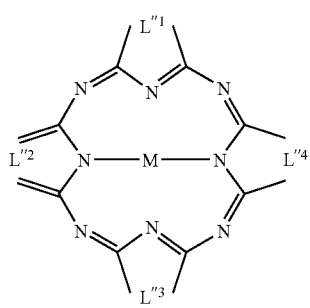  (III)

wherein in formula (III), M represents two hydrogen atoms, a divalent metal atom, a mono-substituted trivalent metal atom, a di-substituted tetravalent metal atom or an oxymetal; $L''^1$, $L''^2$, $L''^3$ and $L''^4$ independently represent formula (c):

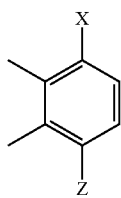

(c)

wherein in formula (c), X represents a substituted or unsubstituted alkyl group, alkoxy group, alkylthio group, aryloxy group, and arylthio group; Z independently represents a hydrogen atom, a nitro group, or a halogen atom and at least one of Z in $L'''^1$ to $L'''^4$ is a hydrogen atom, with a Vilsmeier complex prepared from a compound having an N—CHO group and a halogenating agent to synthesize an immonium salt of the phthalocyanine compound;

adding a basic compound having the following general formula (IV):

wherein R' represents a hydrogen atom, an unsubstituted alkyl group with 1 to 4 of total carbon numbers, or a substituted or unsubstituted aryl group with 6 to 15 of total carbon numbers; and reacting the product from the previous step with a compound having the following general formula (V):

wherein A represents a carbonyl group, a thiocarbonyl group, a sulfone group, a sulfine group or a carboimidoyl group; and Y represents a metal compound residue.

6. An optical recording medium containing the phthalocyanine mixture according to claim 4 in its recording layer.

7. A process for preparing the phthalocyanine compound according to claim 3, which comprises the steps of:

reacting a phthalocyanine compound represented by the following general formula (III):

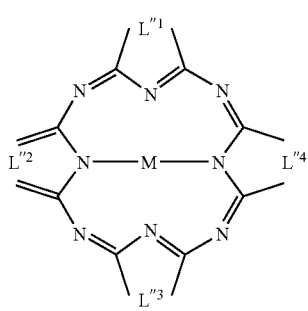

wherein in formula (III), M represents two hydrogen atoms, a divalent metal atom, a mono-substituted trivalent metal atom, a di-substituted tetravalent metal atom or an oxymetal; $L'''^1$, $L'''^2$, $L'''^3$ and $L'''^4$ independently represent formula (C):

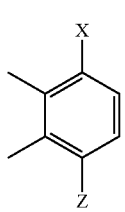

(c)

wherein in formula (c), X represents a substituted or unsubstituted alkyl group, alkoxy group, alkylthio group, aryloxy group, and arylthio group; Z independently represents a hydrogen atom, a nitro group, or a halogen atom and at least one of Z in $L'''^1$ to $L'''^4$ is a hydrogen atom, with a Vilsmeier complex prepared from a compound having an N-CHO group and a halogenating agent to synthesize an immonium salt of the phthalocyanine compound;

adding a basic compound having the following general formula (IV):

wherein R' represents a hydrogen atom, an unsubstituted alkyl group with 1 to 4 of total carbon numbers, or a substituted or unsubstituted aryl group with 6 to 15 of total carbon numbers; and reacting the product from the previous step with a compound having the following general formula (V):

wherein A represents a carbonyl group, a thiocarbonyl group, a sulfone group, a sulfine group or a carboimidoyl group; and Y represents a metal compound residue.

8. A process for preparing the phthalocyanine compound according to claim 2, which comprises the steps of:

reacting a phthalocyanine compound represented by the following general formula (III):

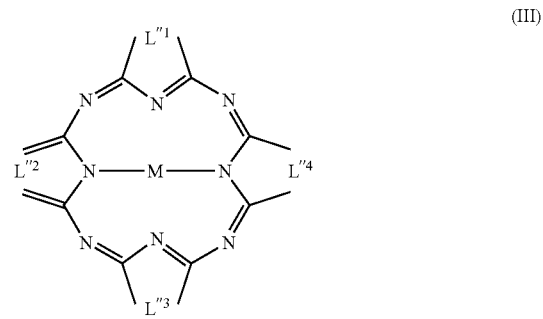

wherein in formula (III), M represents two hydrogen atoms, a divalent metal atom, a mono-substituted trivalent metal atom, a di-substituted tetravalent metal atom or an oxymetal; $L'''^1$, $L'''^2$, $L'''^3$ and $L'''^4$ independently represent formula (c):

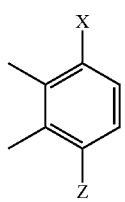

(c)

wherein in formula (c), X represents a substituted or unsubstituted alkyl group, alkoxy group, alkylthio group, aryloxy group, and arylthio group; Z independently represents a hydrogen atom, a nitro group, or a halogen atom and at least one of Z in $L'''^1$ to $L'''^4$ is a hydrogen atom, with a Vilsmeier complex prepared from a compound having an N-CHO group and a halogenating agent to synthesize an immonium salt of the phthalocyanine compound;

adding a basic compound having the following general formula (IV):

R'—NH$_2$ (IV)

wherein R' represents a hydrogen atom, an unsubstituted alkyl group with 1 to 4 of total carbon numbers, or a substituted or unsubstituted aryl group with 6 to 15 of total carbon numbers; and reacting the product from the previous step with a compound having the following general formula (V):

Y-A-NH$_2$ (V)

wherein A represents a carbonyl group, a thiocarbonyl group, a sulfone group, a sulfine group or a carboimidoyl group; and Y represents a metal compound residue.

9. A process for preparing the phthalocyanine compound according to claim 1, which comprises the steps of:

reacting a phthalocyanine compound represented by the following general formula (III):

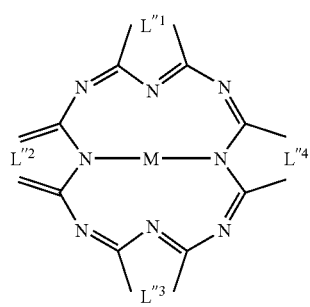

(III)

wherein in formula (III), M represents two hydrogen atoms, a divalent metal atom, a mono-substituted trivalent metal atom, a di-substituted tetravalent metal atom or an oxymetal; L'''$^1$, L'''$^2$, L'''3 and L'''$^4$ independently represent formula (c):

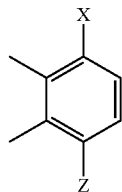

(c)

wherein in formula (c), X represents a substituted or unsubstituted alkyl group, alkoxy group, alkylthio group, aryloxy group, and arylthio group; Z independently represents a hydrogen atom, a nitro group, or a halogen atom and at least one of Z in L'''$^1$ to L'''$^4$ is a hydrogen atom, with a Vilsmeier complex prepared from a compound having an N-CHO group and a halogenating agent to synthesize an immonium salt of the phthalocyanine compound;

adding a basic compound having the following general formula (IV):

R'—NH$_2$ (IV)

wherein R' represents a hydrogen atom, an unsubstituted alkyl group with 1 to 4 of total carbon numbers, or a substituted or unsubstituted aryl group with 6 to 15 of total carbon numbers; and reacting the product from the previous step with a compound having the following general formula (V):

Y-A-NH$_2$ (V)

wherein A represents a carbonyl group, a thiocarbonyl group, a sulfone group, a sulfine group or a carboimidoyl group; and Y represents a metal compound residue.

10. An optical recording medium containing the phthalocyanine compound according to claim 3 in its recording layer.

11. An optical recording medium containing the phthalocyanine compound according to claim 2 in its recording layer.

12. An optical recording medium containing the phthalocyanine compound according to claim 1 in its recording layer.

* * * * *